(12) United States Patent
Aluru et al.

(10) Patent No.: US 11,418,742 B2
(45) Date of Patent: Aug. 16, 2022

(54) SYSTEM AND METHOD FOR ANALYZING CAMERA PERFORMANCE DEGRADATION DUE TO LENS ABRASION

(71) Applicant: GM GLOBAL TECHNOLOGY OPERATIONS LLC, Detroit, MI (US)

(72) Inventors: Sai Vishnu Aluru, Commerce Township, MI (US); Jay H. Sim, Bloomfield, MI (US); David A. Osinski, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 247 days.

(21) Appl. No.: 16/744,942

(22) Filed: Jan. 16, 2020

(65) Prior Publication Data

US 2021/0227160 A1 Jul. 22, 2021

(51) Int. Cl.
| | |
|---|---|
| H04N 5/217 | (2011.01) |
| H04N 5/369 | (2011.01) |
| G06T 7/00 | (2017.01) |
| G06T 7/13 | (2017.01) |
| G06T 7/10 | (2017.01) |
| H04N 5/225 | (2006.01) |

(52) U.S. Cl.
CPC ......... *H04N 5/36961* (2018.08); *G06T 7/001* (2013.01); *G06T 7/0002* (2013.01); *G06T 7/10* (2017.01); *G06T 7/13* (2017.01); *H04N 5/2171* (2013.01); *H04N 5/36963* (2018.08); *G06T 2207/30168* (2013.01); *H04N 5/2257* (2013.01)

(58) Field of Classification Search
None
See application file for complete search history.

(56) References Cited

U.S. PATENT DOCUMENTS

| | | | | |
|---|---|---|---|---|
| 2010/0283876 | A1* | 11/2010 | Chan | G06T 7/33 |
| | | | | 348/E5.076 |
| 2013/0107059 | A1* | 5/2013 | Baba | H04N 17/002 |
| | | | | 348/188 |
| 2017/0069068 | A1* | 3/2017 | Chang | G06T 5/008 |
| 2019/0080199 | A1* | 3/2019 | Nakamura | G06T 7/181 |
| 2019/0278986 | A1* | 9/2019 | Nepomniachtchi | G06K 9/42 |
| 2021/0090260 | A1* | 3/2021 | Ikeda | G06T 7/162 |
| 2021/0272285 | A1* | 9/2021 | Meglan | G06T 7/0002 |

\* cited by examiner

*Primary Examiner* — Twyler L Haskins
*Assistant Examiner* — Wesley J Chiu (57) ABSTRACT

A method includes capturing a first image of an object at a first time using a camera and assigning shade values to a plurality of pixels in a portion of the first image. The object includes a light portion and a dark portion that is darker than the light portion. The method further includes identifying a first mode value of the shade values corresponding to the light portion of the object in the first image, and identifying a second mode value of the shade values corresponding to the dark portion of the object in the first image. The method further includes determining a difference between the first and second mode values, and determining a contrast of the first image based on the difference.

19 Claims, 6 Drawing Sheets

SYSTEM AND METHOD FOR ANALYZING CAMERA PERFORMANCE DEGRADATION DUE TO LENS ABRASION

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to systems and methods for analyzing camera performance degradation due to lens abrasion.

An automotive vehicle typically includes a camera that captures images of an environment around the vehicle and an electronic display that displays the images captured by the camera. The electronic display this positioned within view of a driver of the vehicle so that the driver may identify objects near the vehicle and/or lane boundaries as the driver operates the vehicle. When the lens of the camera becomes dirty, the quality of the image captured by the camera degrades, in which case the driver often cleans the lens by wiping the lens with their finger. Over time, this action creates microscopic abrasions on the lens, which degrades the viewing performance of the camera and the contrast of images captured by the camera.

SUMMARY

A first example of a method according to the present disclosure includes capturing a first image of an object at a first time using a camera and assigning shade values to a plurality of pixels in a portion of the first image. The object includes a light portion and a dark portion that is darker than the light portion. The method further includes identifying a first mode value of the shade values corresponding to the light portion of the object in the first image, and identifying a second mode value of the shade values corresponding to the dark portion of the object in the first image. The method further includes determining a difference between the first and second mode values, and determining a contrast of the first image based on the difference.

In one example, the method further includes determining that the contrast of the first image is unacceptable when the difference is less than a predetermined value.

In one example, the light portion is white in color, the dark portion is black in color, and the shade values indicate shades of grey.

In one example, the shade values indicate shades of grey with lower ones of the shade values indicating darker shades of grey and higher ones of the shade values indicating lighter shades of grey.

In one example, the portion of the first image does not include the entire first image.

In one example, the portion of the first image includes a predetermined number of pixels on both sides of an edge between the light portion of the object and the dark portion of the object.

In one example, the object includes a first white vertical bar, a second white vertical bar, and a black vertical bar disposed between the first and second white vertical bars, the white vertical bars form the light portion of the object, and the black vertical bar forms the dark portion of the object.

In one example, the portion of the first image includes a first predetermined number of pixels on both sides of a first vertical edge between the first white vertical bar and the black vertical bar, and a second predetermined number of pixels on both sides of a second vertical edge between the black vertical bar and the second white vertical bar.

In one example, the portion of the first image includes the first predetermined number of pixels on both sides of the first vertical edge for all horizontal rows of pixels in the first image, and the second predetermined number of pixels on both sides of the second vertical edge for all of the horizontal rows of pixels in the first image.

In one example, the method further includes capturing a second image of the object at a second time using the camera, assigning shade values to a plurality of pixels in a portion of the second image, identifying a third mode value of the shade values corresponding to the light portion of the object in the second image, identifying a fourth mode value of the shade values corresponding to the dark portion of the object in the second image, determining a difference between the third and fourth mode values; and determining a degradation in a viewing performance of the camera based on (i) the difference between the first and second mode values and (ii) the difference between the third and fourth mode values. The second time is later than the first time.

In one example, the method further includes applying wear to a lens of the camera according to a predetermined procedure during a period between the first and second times.

In one example, the method further includes normalizing the difference between the third and fourth mode values with respect to the difference between the first and second mode values, and determining the degradation in the viewing performance of the camera based on the normalized difference.

In one example, the method further includes determining that the degradation in the viewing performance of the camera is unacceptable when the normalized difference is less than a predetermined value.

A second example of a method according to the present disclosure includes capturing a first image of an object at a first time using a camera and assigning shade values to a plurality of pixels in a portion of the first image. The object includes a light portion and a dark portion that is darker than the light portion. The method further includes identifying a first mode value of the shade values corresponding to the light portion of the object in the first image, identifying a second mode value of the shade values corresponding to the dark portion of the object in the first image, and determining a difference between the first and second mode values. The method further includes capturing a second image of the object at a second time using the camera and assigning shade values to a plurality of pixels in a portion of the second image. The second time is later than the first time. The method further includes identifying a third mode value of the shade values corresponding to the light portion of the object in the second image, identifying a fourth mode value of the shade values corresponding to the dark portion of the object in the second image, determining a difference between the third and fourth mode values, and determining a degradation in a viewing performance of the camera based on (i) the difference between the first and second mode values and (ii) the difference between the third and fourth mode values.

In one example, the method further includes applying wear to a lens of the camera according to a predetermined procedure during a period between the first and second times.

In one example, the method further includes normalizing the difference between the third and fourth mode values with respect to the difference between the first and second mode values, and determining the degradation in the viewing performance of the camera based on the normalized difference.

In one example, the object includes a first white vertical bar, a second white vertical bar, and a black vertical bar disposed between the first and second white vertical bars, the white vertical bars form the light portion of the object, and the black vertical bar forms the dark portion of the object.

In one example, each of the portion of the first image and the portion of the second image includes a first predetermined number of pixels on both sides of a first vertical edge between the first white vertical bar and the black vertical bar, and a second predetermined number of pixels on both sides of a second vertical edge between the black vertical bar and the second white vertical bar.

In one example, each of the portion of the first image and the portion of the second image includes the first predetermined number of pixels on both sides of the first vertical edge for all horizontal rows of pixels in the first image, and the second predetermined number of pixels on both sides of the second vertical edge for all of the horizontal rows of pixels in the first image.

An example of a system according to the present disclosure includes an electronic display, a camera, a shade value module, a mode value module, and a contrast module. The camera is configured to capture a first image of an object at a first time and capture a second image of the object at a second time. The object includes a light portion and a dark portion that is darker than the light portion. The second time is later than the first time. The shade value module is configured to assign shade values to a plurality of pixels in a portion of the first image and assign shade values to a plurality of pixels in a portion of the second image. The mode value module is configured to identify a first mode value of the shade values corresponding to the light portion of the object in the first image, identify a second mode value of the shade values corresponding to the dark portion of the object in the first image, identify a third mode value of the shade values corresponding to the light portion of the object in the second image, and identify a fourth mode value of the shade values corresponding to the dark portion of the object in the second image. The contrast module is configured to determine a difference between the first and second mode values, determine a difference between the third and fourth mode values, normalize the difference between the third and fourth mode values with respect to the difference between the first and second mode values, determine that a degradation in a viewing performance of the camera is unacceptable when the normalized difference is less than a predetermined value, and control the electronic display to display a message indicating when the degradation in the viewing performance of the camera is unacceptable.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

The mechanical cleaning action discussed above may have a greater effect on the viewing performance of some cameras relative to other cameras. Thus, it may be desirable to develop a standard procedure for the mechanical cleaning action, and to evaluate its effect on the viewing performance of the camera. In addition, to ensure that the effect on the viewing performance is evaluated in the same way for each camera under test, it may be desirable to quantify degradation in the viewing performance of the camera due to the mechanical cleaning action.

A system and method according to the present disclosure subjects a camera to a standardized mechanical cleaning action and evaluates its effect on the viewing performance of the camera over time by analyzing the real and test images captured by the camera. The real images are images captured by the camera when the environment surrounding a vehicle is in view of the camera. The test images are images captured by the camera when a test object is in view of the camera. The test object may include a simplified image, such as a black vertical bar disposed between a pair of white vertical bars.

The real and test images are captured in pairs by the camera after the lens of the camera is subjected to a certain amount of the mechanical cleaning action. The real images are subjectively evaluated by a test audience, such as actual or potential customers of a vehicle, to determine when the viewing performance of the camera becomes unacceptable due to the mechanical cleaning action. The test images are objectively evaluated to create quantified metrics that correlate to the subjective or qualified observations. In one example, instead of evaluating the entire test images, the system and method only analyzes the contrast of the test images at their visible edges to save processing time and reduce required processor capacity.

The quantified metrics of the test images are compared to the qualified observations of the real images to determine pass/fail criteria for the performance of the camera when subjected to the mechanical cleaning action. Once the pass/fail criteria is established, the real images are no longer needed. Rather, the system and method simply compares the quantified metrics to the pass/fail criteria to determine whether the degradation in the viewing performance of the camera is acceptable.

The system and method according to the present disclosure may be used by automotive manufacturers to evaluate the resiliency of various cameras when the cameras are subjected to the standardized mechanical cleaning action. In addition, the system and method according to the present disclosure may be used in a vehicle to automatically detect when the degradation in the performance of a camera on the vehicle is unacceptable and to notify a driver of the vehicle regarding the same.

Figure 1:
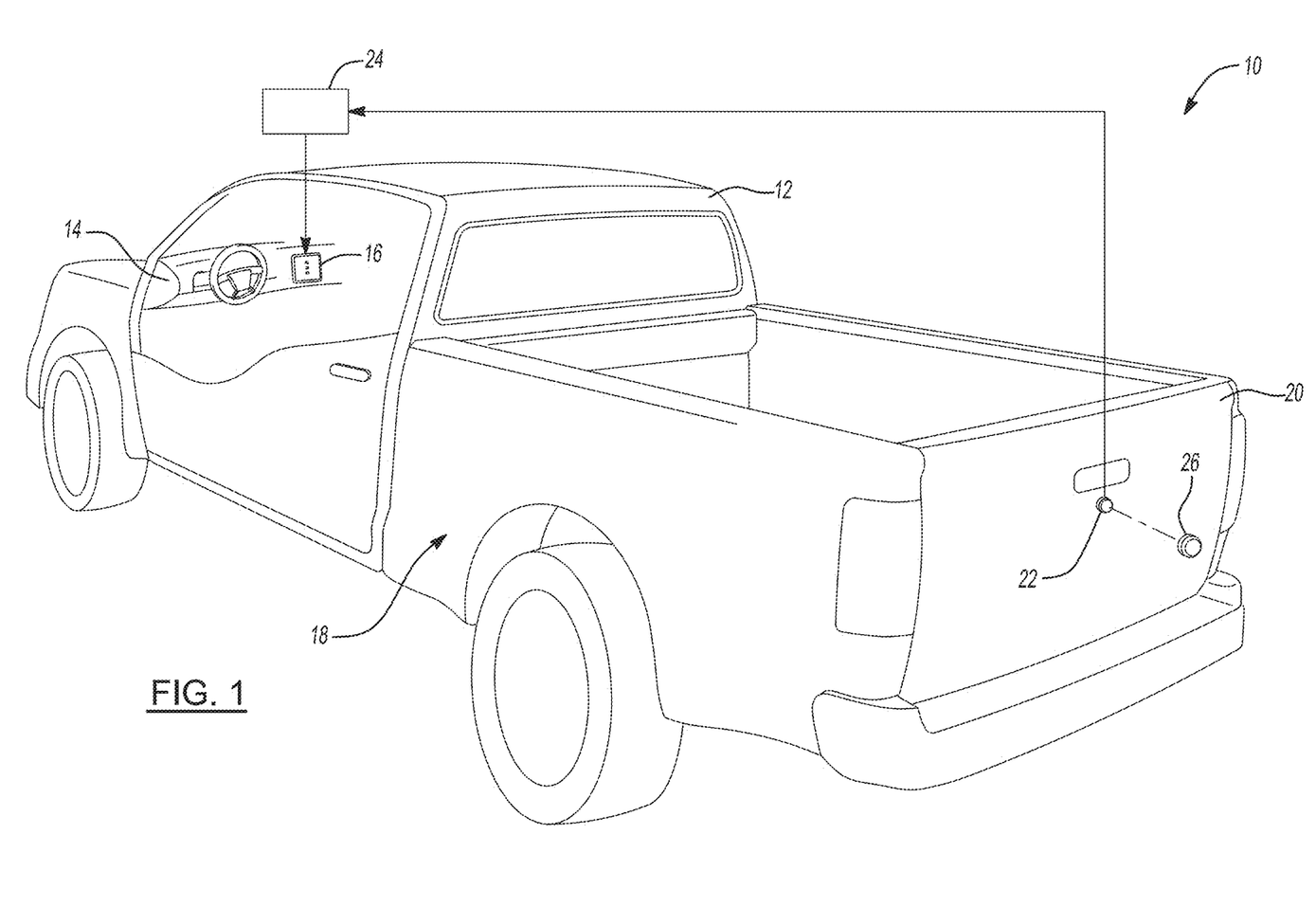
FIG. 1 is a perspective view of an example vehicle including a camera and a system for analyzing the viewing performance of the camera according to the present disclosure.

Referring now to FIG. 1, an example vehicle 10 includes a cab 12, an instrument panel 14, an electronic display 16, a cargo bed 18, a tailgate 20, a camera 22, and a display control module 24. The vehicle 10 may be a pickup as shown on another type of vehicle such as a sedan or coupe. The electronic display 16 may be located in the instrument panel 14 as shown, in a rear view mirror (now shown), and/or in another suitable location that is visible to a driver of the vehicle 10. The electronic display 16 may be a touchscreen.

In the example shown, the camera 22 is mounted on the tailgate 20 and is operable to capture an image of the environment behind the vehicle 10. In other examples, the camera 22 may be mounted to other components of the vehicle 10 and/or may capture an image of the environment in front of the vehicle 10, on one side of the vehicle 10, or within an interior of the vehicle 10. The electronic display 16 is operable to display the image captured by the camera 22. The driver may view the image displayed on the electronic display 16 when reversing the vehicle 10 to identify lane boundaries and/or objects located rearward of the vehicle 10.

The display control module 24 controls the electronic display 16. The display control module 24 receives the image captured by the camera 22 and controls the electronic display 16 to display the image. In addition, the display control module 24 analyzes the viewing performance of the camera 22 and controls the electronic display 16 to output the results of the analysis. In one example, the display control module 24 controls the electronic display 16 to indicate that the camera 22 should be serviced when the viewing performance of the camera 22 is unacceptable.

The display control module 24 analyzes the viewing performance of the camera 22 using a test object 26. In the example shown, the test object 26 is a lens cover that fits over a lens of the camera 22. The test object 26 may be permanently mounted to the tailgate 20 and movable between a first position in which the test object 26 covers the lens of the camera 22 and a second position in which the test object 26 does not cover the lens of the camera 22. The test object 26 may be mounted to the tailgate 20 using a hinge or sliding mechanism that allows the test object 26 to move between the first and second positions.

In addition, the display control module 24 may control an electromechanical actuator (e.g., a motor) on the vehicle 10 to automatically move the test object 26 between the first and second positions. For example, the display control module 24 may control the actuator to move the test object to the first position when the display control module 24 analyzes the viewing performance of the camera 22, which the display control module 24 may do on a periodic basis. Otherwise, the display control module 24 may control the actuator to move the test object to the second position. In other examples, the test object 26 may be only temporarily mounted to the tailgate in the first position and/or the test object 26 may be moved between the first and second positions by hand. In still other examples, the test object 26 may be only temporarily held in view of the lens of the camera 22 while the camera 22 captures an image of the test object 26.

Figure 4A:
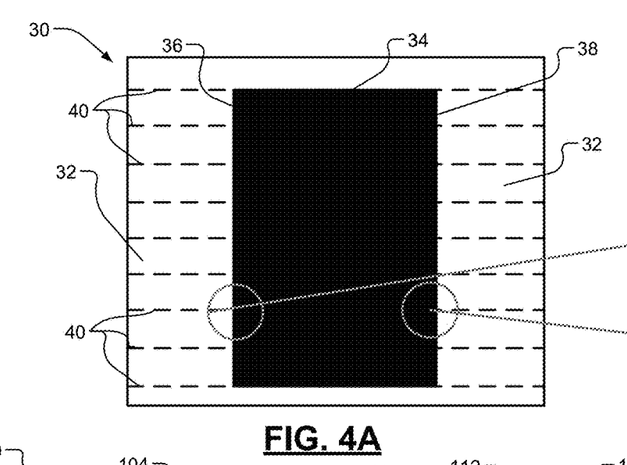
FIG. 4A is an example image captured by the camera showing a test object according to the present disclosure.

An image such as an image 30 shown in FIG. 4A may be included or displayed on a surface of the test object 26 that faces the lens of the camera 22 when the test object 26 is in the first position or is otherwise in view of the camera 22. The image 30 includes a pair of lighter portions 32 and a darker portion 34 disposed between the lighter portions 32. The darker portion 34 is darker than the lighter portions 32. In the example shown, each of the lighter portions 32 is formed by a white vertical bar, and the darker portion 34 is formed by a black vertical bar.

The image 30 further includes a first vertical edge 36 and a second vertical edge 38. The first vertical edge 36 is disposed between the darker portion 34 of the image 30 and the lighter portion 32 of the image 30 on the left side of the image 30 as shown in FIG. 4A. The second vertical edge 38 is disposed between the darker portion 34 of the image 30 and the lighter portion 32 of the image 30 on the right side of the image 30 as shown in FIG. 4A.

The display control module 24 may analyze the viewing performance of the camera 22 using an image captured by the camera 22 when the test object 26 is positioned so that the image 30 is in view of the lens of the camera 22. In one example, the display control module 24 assigns shade values to a predetermined number of pixels on both sides of each of the first and second vertical edges 36 and 38. The shade values indicate shades of gray with lower ones of the shade values indicating darker shades of grey and higher ones of the shade values indicating lighter shades of grey. For example, a shade value of zero may indicate black, and a shade value of 255 may indicate white.

The display control module 24 then determines a first (statistical) mode of the shade values corresponding to the lighter portions 32 of the image 30 and a second (statistical) mode of the shade values corresponding to the darker portions 34 of the image 30. The display control module 24 then assesses the contrast of the image captured by the camera 22 based on the difference between first and second modes. If the contrast of the image captured by the camera 22 were ideal, the difference between the first and second modes would be equal to the difference between the shade value that indicates black and the shade value that indicates white. However, a difference between the first and second modes that is less than the difference between the black shade value and the white shade value may still be acceptable to a driver (and/or passenger) of the vehicle 10.

Figure 2:
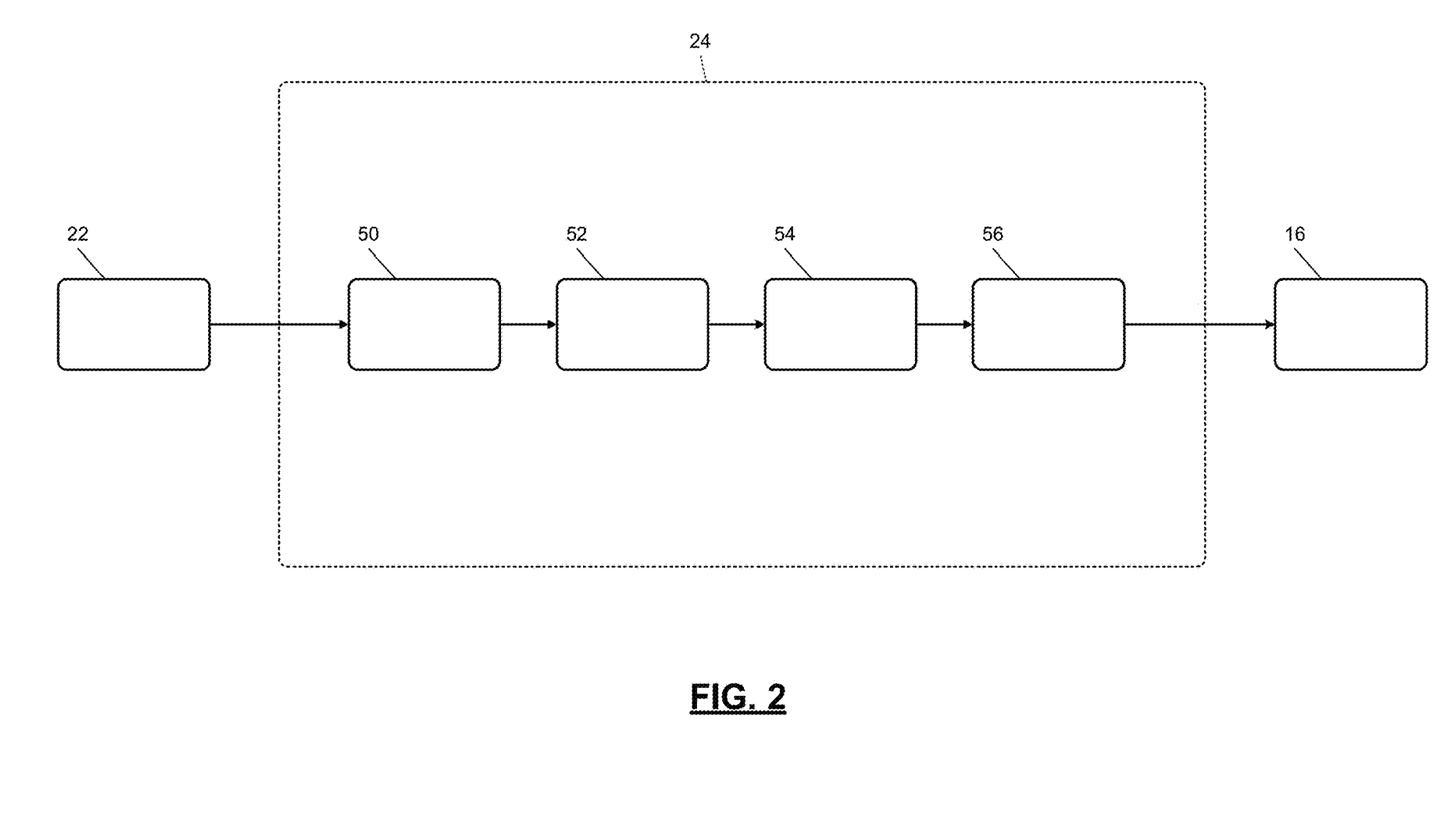
FIG. 2 is a functional block diagram of an example system for analyzing the viewing performance of the camera according to the present disclosure.

Referring now to FIG. 2, an example implementation of the display control module 24 includes an edge detection module 50, a shade value module 52, a mode value module 54, and a contrast module 56. The edge detection module 50 detects the first and second vertical edges 36 and 38 in an image captured by the camera 22 when the image 30 of FIG. 4A is in view of the camera 22. The edge detection module 50 may detect the first and second vertical edges 36 and 38 by identifying points in the image captured by the camera 22 at which the brightness of the image changes sharply or has discontinuities. The edge detection module 50 output the location of the first and second vertical edges 36 and 38 and/or the pixels in the image captured by the camera 22 that correspond to the first and second vertical edges 36 and 38.

The shade value module 52 assigns shade values to a first number (e.g., 6) of pixels immediately to the left of the first vertical edge 36 and a second number (e.g., 6) of pixels immediately to the right of the first vertical edge 36. Similarly, the shade value module 52 assigns shade values to the first number pixels immediately to the left of the second vertical edge 38 and the second number of pixels immediately to the right of the second vertical edge 38. The first and second numbers of pixels may be predetermined. The second number of pixels may be equal to the first number of pixels or different than the first number of pixels.

Figure 4B:
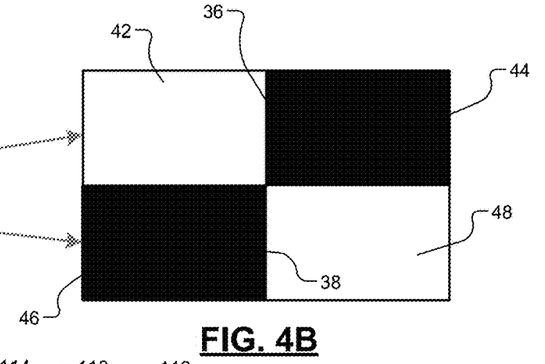
FIG. 4B is an enlarged view of the image of FIG. 4A.

The shade value module 52 assigns shade values to the first and second numbers of pixels immediately to the left and right of the first and second vertical edges 36 and 38 for all of the horizontal rows of pixels in the image captured by the camera 22. For example, briefly referring to FIGS. 4A and 4B, each image captured by the camera 22 includes a plurality of horizontal rows 40 of pixels shown in FIG. 4A. FIG. 4B shows the pixels immediately to the left and right of the first and second vertical edges 36 and 38 for one of the horizontal rows 40. More specifically, the upper half of FIG. 4B shows, for one of the horizontal rows 40, a first pixel 42 immediately to the left of the first vertical edge 36 and a second pixel 44 immediately to the right of the first vertical edge 36. Meanwhile, the lower half of FIG. 4B shows, for the same one of the horizontal rows 40, a third pixel 46 immediately to the left of the second vertical edge 38 and a fourth pixel 48 immediately to the right of the second vertical edge 38.

If the first and second numbers of pixels were each equal to one, the shade value module 52 would assign shade values to only the first, second, third, and fourth pixels 42, 44, 46, and 48 for each of the horizontal rows 40 of pixels in the image. If the first and second numbers of pixels were greater than one, the shade value module 52 would assign shade values to a greater number of pixels in each of the horizontal rows 40 of pixels in the image. While FIG. 4A only depicts nine of the horizontal rows 40 of pixels in the image, each image captured by the camera 22 may include a significantly greater number (e.g., hundreds) of horizontal rows of pixels. The shade value module 52 outputs the shade values assigned to the pixels in the image captured by the camera 22.

Referring again to FIG. 2, the mode value module 54 determines a first mode value of the shade values corresponding to the lighter portions 32 of the image 30 and a second mode value of the shade values corresponding to the darker portion 34 of the image 30. In other words, the mode value module 54 determines which shade value is assigned most often to pixels in the lighter portions 32 of the image 30 and which shade value is assigned most often to pixels in the darker portion 34 of the image 30. The mode value module 54 may determine which shade values correspond to the lighter portions 32 and which shade values correspond to the darker portion 34 based on the range of shade values between the highest and lowest shade values. For example, if a shade value of zero indicates black, and a shade value of 255 indicates white, the mode value module 54 may determine that shade values between zero and 127 correspond to the darker portion 34 and shade values between 128 and 255 correspond to the lighter portions 32. The mode value module 54 outputs the first and second mode values.

The contrast module 56 determines the contrast of image captured by the camera 22 based on the difference between the first and second mode values. In one example, the contrast module 56 determines that the contrast of the image is acceptable when the difference between the first and second values is greater than or equal to a predetermined value. Conversely, the contrast module 56 determines that the contrast of the image is unacceptable when the difference between the first and second values is less than the predetermined value.

The contrast module 56 may output a signal indicating whether the contrast of the image captured by the camera 22 is acceptable or unacceptable. Additionally or alternatively, the signal output by the contrast module 56 may indicate an instruction to the electronic display 16 to display a message (e.g., text) indicating whether the contrast of the image captured by the camera 22 is acceptable or unacceptable. Additionally or alternatively, when the contrast of the image captured by the camera 22 is unacceptable, the signal output by the contrast module 56 may indicate an instruction to the electronic display 16 to display a message indicating that the camera 22 should be serviced.

Figure 3:
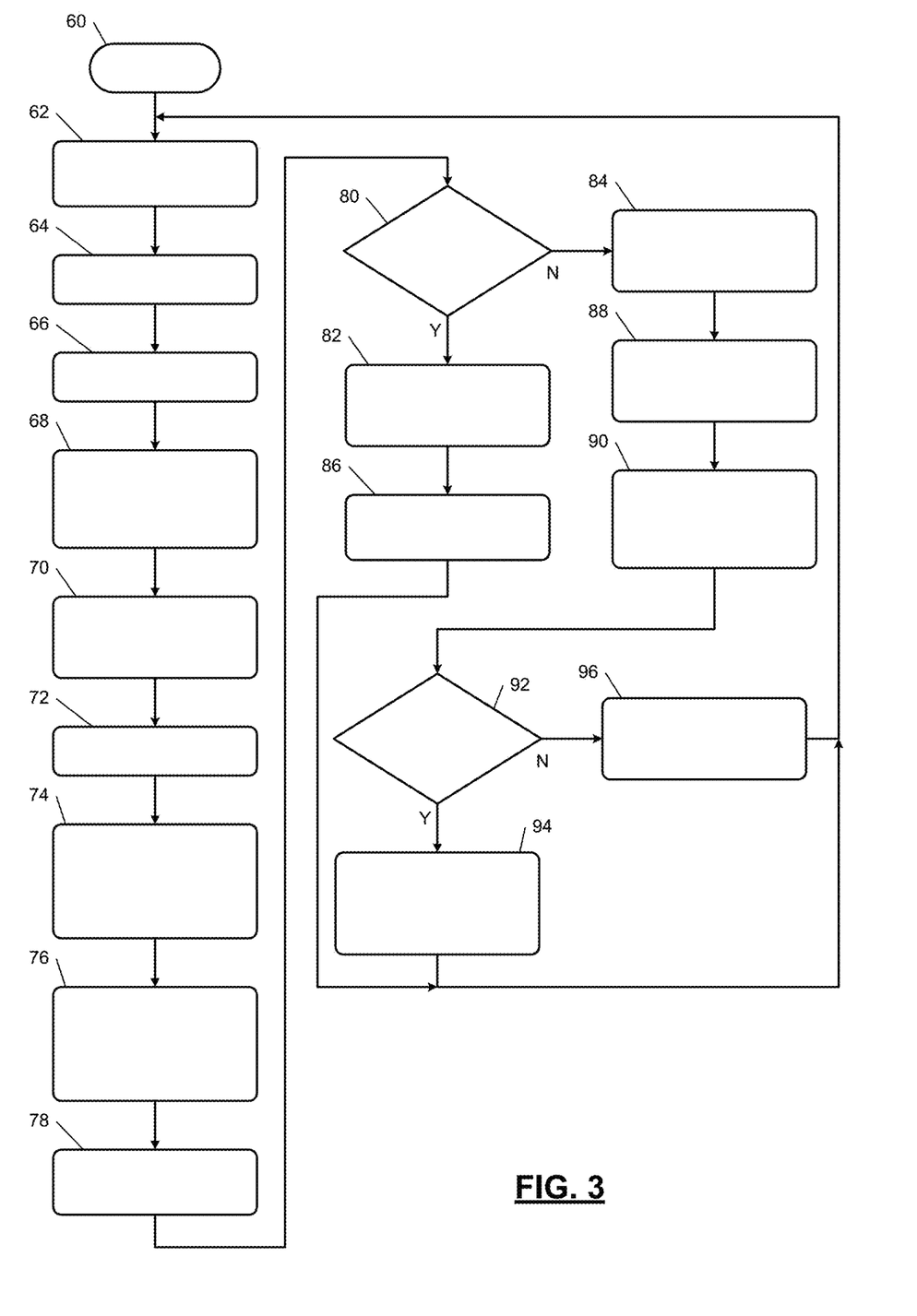
FIG. 3 is a flowchart illustrating an example method for analyzing the viewing performance of the camera according to the present disclosure.

Referring now to FIG. 3, a method for analyzing the viewing performance of the camera 22 begins at 60. The method is described in the context of the camera 22 of FIG. 1 and the modules of FIG. 2. However, the method may be used to analyze the viewing performance of a camera attached to a different location of the vehicle 10 or a camera that is not attached to a vehicle. In addition, the particular modules that perform the steps of the method may be different than the modules mentioned below and/or one or more steps of the method may be implemented apart from the modules of FIG. 2.

Figure 5A:
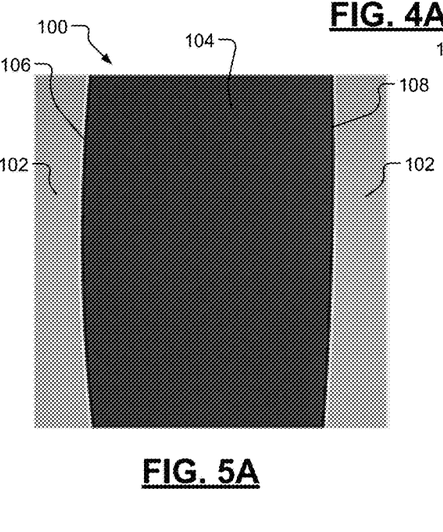
FIG. 5A is another example image of the object of FIG. 4A captured by the camera after a lens of the camera is subjected to a first amount of wear.

At 62, the camera 22 captures an image of an object having light and dark portions. For example, the camera 22 may capture an image of a surface of the test object 26 that includes or displays the image 30 shown in FIG. 4A. FIG. 5A shows an example of an image 100 captured by the camera 22 at a first time when the image 30 is in view of the camera 22 and the camera 22 is new (e.g., the lens of the camera 22 has been subjected to minimal or no wear). The image 100 includes lighter portions 102 and a darker portion 104 disposed between the lighter portions 102. In addition, the image 100 includes a first vertical edge 106 disposed between the darker portion 104 and the lighter portion 102 on the left side of the image 100 as shown in FIG. 5A. Further, the image 100 includes a second vertical edge 108 disposed between the darker portion 104 and the lighter portion 102 on the right side of the image 100 as shown in FIG. 5A.

The lighter portions 102 of the image 100 correspond to the lighter portions 32 of the image 30. The darker portion 104 of the image 100 corresponds to the darker portion 34 of the image 30. The first and second vertical edges 106 and 108 of the image 100 correspond to the first and second vertical edges 36 and 38 of the image 30, respectively.

As is evident when comparing FIGS. 4A and 5A, the image 100 is not an exact replica of the image 30. Instead, the image 100 includes lighter portions 102 that are darker than the lighter portions 32 of the image 30, and the image 100 includes a darker portion 104 that is lighter than the darker portion 34 of the image 30. More specifically, the lighter portions 102 of the image 100 are light gray in color instead of the white color of the lighter portion 32 of the image 30, and the darker portion 104 of the image 100 is a lighter shade of black (or grey) than the shade of black in the darker portion 34 of the image 30. This is because the contrast of images captured by the camera 22 is not perfect (e.g., 100%) even when the camera 22 is new.

Referring now to FIGS. 2 and 5A, at 64, the edge detection module 50 crops one or more regions of interest in the image captured by the camera 22. For example, the edge detection module 50 may crop regions of the image 100 in which the first and second vertical edges 106 and 108 are likely to appear. The locations of these regions may be predetermined based on previous images captured by the camera 22 when the image 30 is in view of the camera 22.

At 66, the edge detection module 50 scans the image captured by the camera 22 to identify the first and second vertical edges 36 and 38. For example, the edge detection module 50 may identify two locations along each horizontal row of pixels in the image 100 at which the brightness of the image 100 has discontinuities, and determine that these locations lie on the first and second vertical edges 106 and 108. The edge detection module 50 may repeat this process for all of the horizontal rows of pixels in the image 100 to identify the first and second vertical edges 106 and 108 from the top of the image to the bottom of the image.

At 68, the shade value module 52 assigns shade values to a predetermined number of pixels on both sides of each of the first and second vertical edges 36 and 38. For example, referring now to FIGS. 2, 5A, and 5B, the shade value module 52 may assign shade values to the first number of pixels immediately to the left of each of the first and second vertical edges 106 and 108. In addition, the shade value module 52 may assign shade values to the second number of pixels immediately to the right of each of the first and second vertical edges 106 and 108.

Figure 5B:
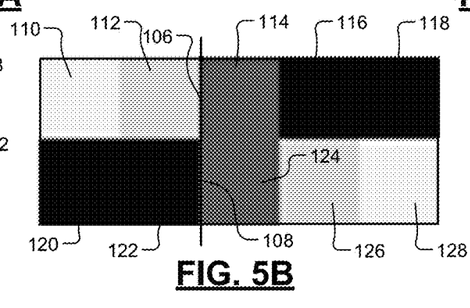
FIG. 5B is an enlarged view of the image of FIG. 5A.

The upper half of FIG. 5B shows an example of pixels immediately to the left and right of the first vertical edge 106. More specifically, the upper half of FIG. 5B shows two pixels to the left of the first vertical edge 106, and three pixels to the right of the first vertical edge 108. Thus, if shade values are only assigned to the pixels shown in FIG. 5B, the first number of pixels is two, and the second number of pixels is three. The two pixels to the left of the first vertical edge 106 include a pixel 110 and a pixel 112. The three pixels to the right of the first vertical edge 106 include a pixel 114, a pixel 116, and a pixel 118.

The lower half of FIG. 5B shows an example of pixels immediately to the left and right of the second vertical edge 108. More specifically, the lower half of FIG. 5B shows two pixels to the left of the second vertical edge 108, and three pixels to the right of the second vertical edge 108. Thus again, if shade values are only assigned to the pixels shown in FIG. 5B, the first number of pixels is two and the second number of pixels is three. The two pixels to the left of the second vertical edge 108 include a pixel 120 and a pixel 122. The three pixels to the right of the second vertical edge 108 include a pixel 124, a pixel 126, and a pixel 128.

At 70, the mode value module 54 forms an array of shade values for each horizontal row of pixels in the image captured by the camera 22. For example, the mode value module 54 may form an array of shade values assigned to all of the pixels 110-128 shown in FIG. 5B, which represent a subset of a single horizontal row of pixels in the image 100. The mode value module 54 may repeat this process for all of the horizontal rows of pixels in the image 100 to form a plurality of shade value arrays.

At 72, the mode value module 54 stacks or combines the shade value arrays to form a histogram. An example of such a histogram is depicted at 130 in FIG. 5C. The histogram 130 has an x-axis 132 that represents shade values and a y-axis 134 that represents counts or occurrences of shade values. In the example shown in FIG. 5C, a shade value of zero indicate black, and a shade value of 255 indicates white. In addition, shade values between zero and 255 indicates shades of gray between white and black, with lower ones of the shade values indicating darker shades of grey and higher ones of the shade values indicating lighter shades of grey.

Figure 5C:
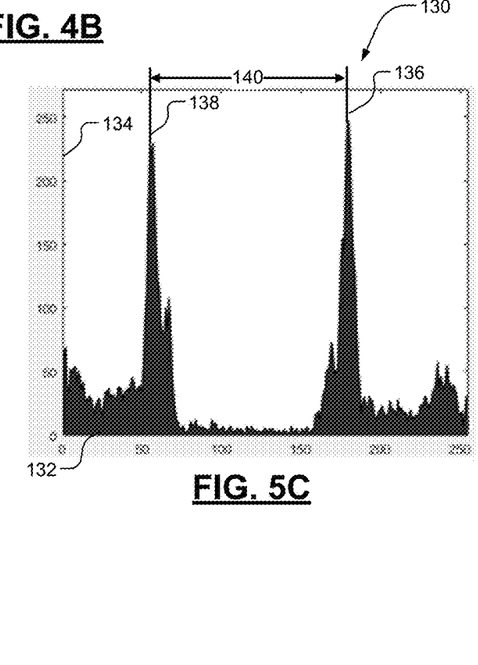
FIG. 5C is an example graph illustrating a number of pixels in the image of FIG. 5A corresponding to various shades of grey.

With continued reference to FIGS. 2 and 5C, at 74, the mode value module 54 identifies a first mode value 136 of shade values corresponding to the lighter portions 102 of the image 100. In the example shown in FIG. 5C, the first mode value 136 is approximately equal to 180, and the number of counts corresponding to the first mode value 136 is approximately equal to 245. At 76, the mode value module 54 identifies a second mode value 138 of shade values corresponding to the darker portion 104 of the image 100. In the example shown in FIG. 5C, the second mode value 138 is approximately equal to 55, and the number of counts corresponding to the second mode value 138 is approximately equal to 230.

At 78, the contrast module 56 determines a difference 140 between the first and second mode values 136 and 138. FIG. 5C illustrates the difference 140, which is approximately equal to 125. At 80, the contrast module 56 determines whether the image 100 is the first one in a set of images. For example, the contrast module 56 may determine that the image 100 is the first one in a set of images if the contrast module 56 has not yet determined and stored a contrast value of an image captured by the camera 22.

If the image 100 is the first one in a set of images, the method continues at 82. Otherwise, the image 100 is a subsequent image (e.g., a second image, a third image), and the method continues at 84. At 82, the contrast module 56 stores the difference 140 between the first and second mode values 136 and 138 as a first difference. At 86, the contrast module 56 sets the contrast of the image 100 (i.e., the first image) at 100 percent.

At 84, the contrast module 56 stores the difference 140 between the first and second mode values 136 and 138 as a subsequent difference. For example, if the image 100 is the second image analyzed by the contrast module 56, the contrast module 56 may store the difference 140 as a second difference. Similarly, if the image 100 is the third image analyzed by the contrast module 56, the contrast module 56 may store the difference 140 as a third difference.

At 88, the contrast module 56 normalizes the subsequent difference with respect to the first difference. For example, the contrast module 56 may divide the subsequent difference by the first difference, and multiply the quotient by 100 to obtain the normalized difference expressed as a percentage. At 90, the contrast module 56 sets the contrast of the image 100 (i.e., the subsequent image) equal to the normalized difference and stores the contrast of the image 100.

At 92, the contrast module 56 determines whether the contrast of the image 100 is less than a predetermined value. If the contrast of the image 100 is less than the predetermined value, the method continues at 94. Otherwise, the method continues at 96. At 94, the contrast module 56 determines that the degradation in the viewing performance of the camera 22 is unacceptable. At 96, the contrast module 56 determines that the degradation in the viewing performance of the camera 22 is acceptable.

Figure 6A:
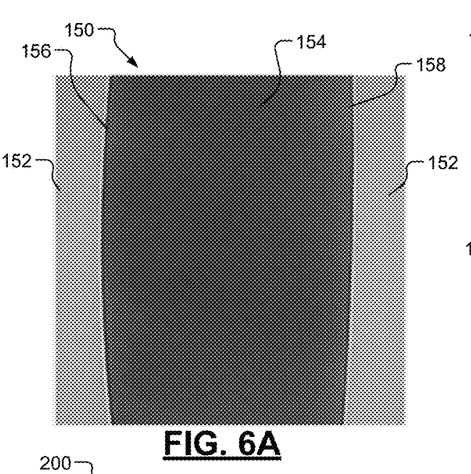
FIG. 6A is another example image of the object of FIG. 4A captured by the camera after a lens of the camera is subjected to a second amount of wear that is greater than the first amount.

FIG. 6A shows an example of an image 150 captured by the camera 22 at a second time when the image 30 is in view of the camera 22 and the lens of the camera 22 has been subjected to a first amount of wear. The second time is later than the first time. Thus, the image 100 of FIG. 5A is an example of the first image referred to above with reference to FIG. 3, and the image 150 of FIG. 6A is an example of the second image referred to above with reference to FIG. 3. The image 150 includes lighter portions 152 and a darker portion 154 disposed between the lighter portions 152. In addition, the image 150 includes a first vertical edge 156 disposed between the darker portion 154 and the lighter portion 152 on the left side of the image 150 as shown in FIG. 6A. Further, the image 150 includes a second vertical edge 158 disposed between the darker portion 154 and the lighter portion 152 on the right side of the image 150 as shown in FIG. 6A.

The lighter portions 152 of the image 150 are a darker shade of gray than the lighter portions 102 of the image 100 and the darker portion 154 of the image 150 is a lighter shade of black (or grey) than the darker portion 104 of the image 100. In turn, the delineation between the lighter portions 152 of the image 150 and the darker portion 154 of the image 150 is less clear than the delineation between the lighter portions 102 of the image 100 and the darker portion 104 of the image 100. Thus, the contrast of the image 150 is worse than the contrast of the image 100 due to abrasions on the lens of the camera 22 as a result of the first amount of wear.

Figure 6B:
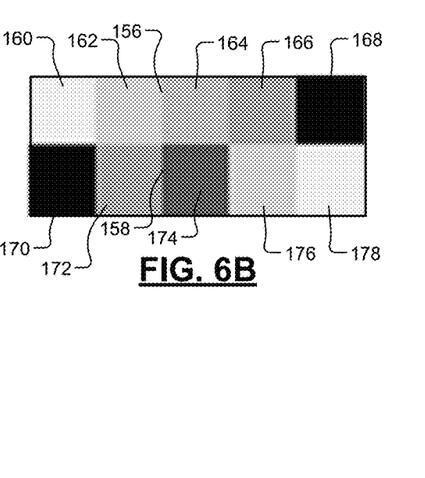
FIG. 6B is an enlarged view of the image of FIG. 6A.

FIG. 6B shows an example of pixels immediately to the left and right of the first and second vertical edges 156 and 158 in one horizontal row of pixels in the image 150. The upper half of FIG. 6B shows pixels immediately to the left and right of the first vertical edge 156. More specifically, the upper half of FIG. 6B shows two pixels to the left of the first vertical edge 156, and three pixels to the right of the first vertical edge 158. The two pixels to the left of the first vertical edge 156 include a pixel 160 and a pixel 162. The three pixels to the right of the first vertical edge 156 include a pixel 164, a pixel 166, and a pixel 168.

The lower half of FIG. 6B shows pixels immediately to the left and right of the second vertical edge 158. More specifically, the lower half of FIG. 6B shows two pixels to the left of the second vertical edge 158, and three pixels to the right of the second vertical edge 158. The two pixels to the left of the second vertical edge 158 include a pixel 170 and a pixel 172. The three pixels to the right of the second vertical edge 158 include a pixel 174, a pixel 176, and a pixel 178.

According to the method of FIG. 3, the mode value module 54 may form an array of shade values assigned to all of the pixels 160-178 shown in FIG. 6B. In addition, the mode value module 54 may repeat this process for all of the horizontal rows of pixels in the image 150 to form a plurality of shade value arrays. Further, the mode value module 54 may stack the shade value arrays to form a histogram.

Figure 6C:
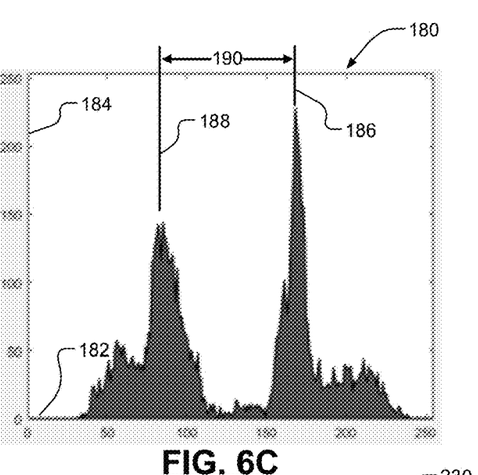
FIG. 6C is an example graph illustrating a number of pixels in the image of FIG. 6A corresponding to various shades of grey.

An example of such a histogram is depicted at 180 in FIG. 6C. The histogram 180 has an x-axis 182 that represents shade values and a y-axis 184 that represents counts or occurrences of shade values. In the example shown in FIG. 6C, a shade value of zero indicate black, and a shade value of 255 indicates white. In addition, shade values between zero and 255 indicates shades of gray between white and black, with lower ones of the shade values indicating darker shades of grey and higher ones of the shade values indicating lighter shades of grey.

According to the method of FIG. 3, the mode value module 54 may identify a first mode value 186 of shade values corresponding to the lighter portions 152 of the image 150. In the example shown in FIG. 6C, the first mode value 186 is approximately equal to 160, and the number of counts corresponding to the first mode value 186 is approximately equal to 240. In addition, according to the method of FIG. 3, the mode value module 54 may identify a second mode value 188 of shade values corresponding to the darker portion 154 of the image 150. In the example shown in FIG. 6C, the second mode value 188 is approximately equal to 85, and the number of counts corresponding to the second mode value 138 is approximately equal to 145. Further, according to the method of FIG. 3, the contrast module 56 may determine a difference 190 between the first and second mode values 186 and 188. FIG. 6C illustrates the difference 190, which is approximately equal to 75.

The difference 140 of FIG. 5C and the difference 190 of FIG. 6C are examples of the first difference and the second difference, respectively, referred to above with reference to FIG. 3. Thus, the contrast module 56 may determine the contrast of the image 150 by normalizing the difference 190 with respect to the difference 140. In other words, the contrast module 56 may divide the difference 190 by the difference 140 and multiply the quotient by 100 obtain the contrast of the image 150 expressed as a percentage. For example, since the difference 140 is approximately 125 and the difference 190 is approximately 75, the contrast module 56 may determine that the contrast of the image 150 is approximately 60 percent.

Figure 7A:
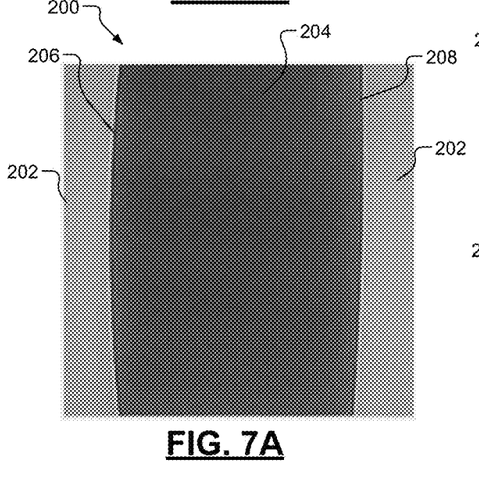
FIG. 7A is another example image of the object of FIG. 4A captured by the camera after the lens of the camera is subjected to a third amount of wear that is greater than the second amount.

FIG. 7A shows an example of an image 200 captured by the camera 22 at a third time when the image 30 is in view of the camera 22 and the lens of the camera 22 has been subjected to a second amount of wear that is greater than the first amount of wear. The third time is later than the second time. Thus, the image 200 of FIG. 7A is an example of the third image referred to above with reference to FIG. 3. The image 200 includes lighter portions 202 and a darker portion 204 disposed between the lighter portions 202. In addition, the image 200 includes a first vertical edge 206 disposed between the darker portion 204 and the lighter portion 202 on the left side of the image 200 as shown in FIG. 7A. Further, the image 200 includes a second vertical edge 208 disposed between the darker portion 204 and the lighter portion 202 on the right side of the image 200 as shown in FIG. 7A.

The lighter portions 202 of the image 200 are a darker shade of gray than the lighter portions 152 of the image 150 and the darker portion 204 of the image 200 is a lighter shade of black (or grey) than the darker portion 154 of the image 150. In turn, the delineation between the lighter portions 202 of the image 200 and the darker portion 204 of the image 200 is less clear than the delineation between the lighter portions 152 of the image 150 and the darker portion 154 of the image 150. Thus, the contrast of the image 200 is worse than the contrast of the image 150 due to abrasions on the lens of the camera 22 as a result of the second amount of wear.

Figure 7B:
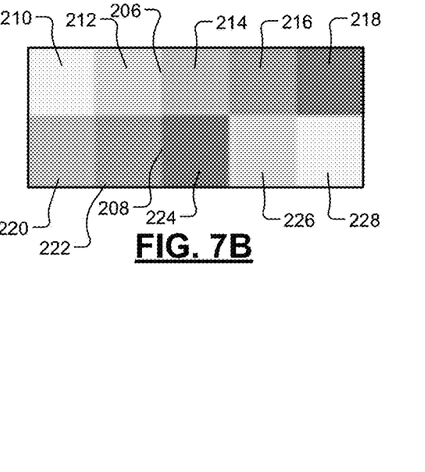
FIG. 7B is an enlarged view of the image of FIG. 7A.

FIG. 7B shows an example of pixels immediately to the left and right of the first and second vertical edges 206 and 208 in one horizontal row of pixels in the image 200. The upper half of FIG. 6B shows pixels immediately to the left and right of the first vertical edge 206. More specifically, the upper half of FIG. 7B shows two pixels to the left of the first vertical edge 206, and three pixels to the right of the first vertical edge 208. The two pixels to the left of the first vertical edge 206 include a pixel 210 and a pixel 212. The three pixels to the right of the first vertical edge 206 include a pixel 214, a pixel 216, and a pixel 218.

The lower half of FIG. 7B shows pixels immediately to the left and right of the second vertical edge 208. More specifically, the lower half of FIG. 7B shows two pixels to the left of the second vertical edge 208, and three pixels to the right of the second vertical edge 208. The two pixels to the left of the second vertical edge 208 include a pixel 220 and a pixel 222. The three pixels to the right of the second vertical edge 208 include a pixel 224, a pixel 226, and a pixel 228.

According to the method of FIG. 3, the mode value module 54 may form an array of shade values assigned to all of the pixels 210-228 shown in FIG. 7B. In addition, the mode value module 54 may repeat this process for all of the horizontal rows of pixels in the image 200 to form a plurality of shade value arrays. Further, the mode value module 54 may stack the shade value arrays to form a histogram.

Figure 7C:
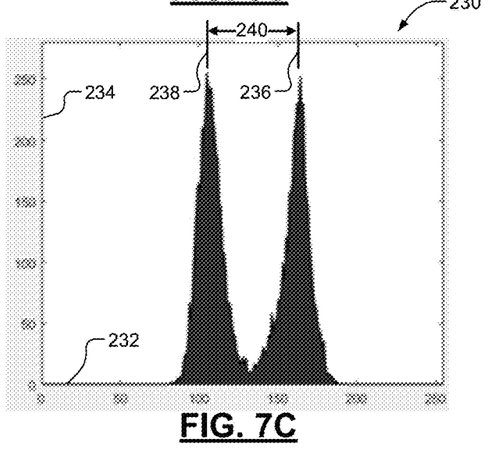
FIG. 7C is an example graph illustrating a number of pixels in the image of FIG. 7A corresponding to various shades of grey.

An example of such a histogram is depicted at 230 in FIG. 7C. The histogram 230 has an x-axis 232 that represents shade values and a y-axis 234 that represents counts or occurrences of shade values. In the example shown in FIG. 7C, a shade value of zero indicate black, and a shade value of 255 indicates white. In addition, shade values between zero and 255 indicates shades of gray between white and black, with lower ones of the shade values indicating darker shades of grey and higher ones of the shade values indicating lighter shades of grey.

According to the method of FIG. 3, the mode value module 54 may identify a first mode value 236 of shade values corresponding to the lighter portions 202 of the image 200. In the example shown in FIG. 7C, the first mode value 236 is approximately equal to 160, and the number of counts corresponding to the first mode value 236 is approximately equal to 250. In addition, according to the method of FIG. 3, the mode value module 54 may identify a second mode value 238 of shade values corresponding to the darker portion 204 of the image 200. In the example shown in FIG. 7C, the second mode value 238 is approximately equal to 110, and the number of counts corresponding to the second mode value 138 is approximately equal to 255. Further, according to the method of FIG. 3, the contrast module 56 may determine a difference 240 between the first and second mode values 236 and 238. FIG. 7C illustrates the difference 240, which is approximately equal to 50.

The difference 240 of FIG. 6C is an example of the third difference referred to above with reference to FIG. 3. Thus, the contrast module 56 may determine the contrast of the image 200 by normalizing the difference 240 with respect to the difference 140. In other words, the contrast module 56 may divide the difference 240 by the difference 140 and multiply the quotient by 100 obtain the contrast of the image 200 expressed as a percentage. For example, since the difference 140 is approximately 125 and the difference 240 is approximately 50, the contrast module 56 may determine that the contrast of the image 200 is approximately 40 percent.

Figure 8:
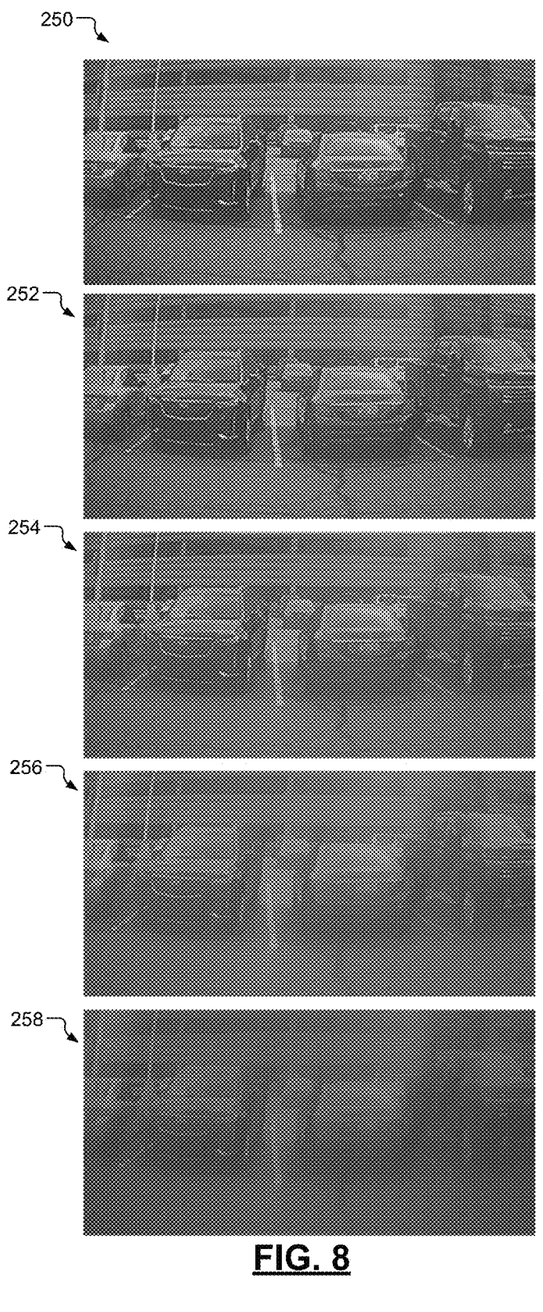
FIG. 8 shows a plurality of example images captured by the camera after the lens of the camera is subjected to various amounts of wear, where the images show an environment behind the vehicle.
Figure 9:
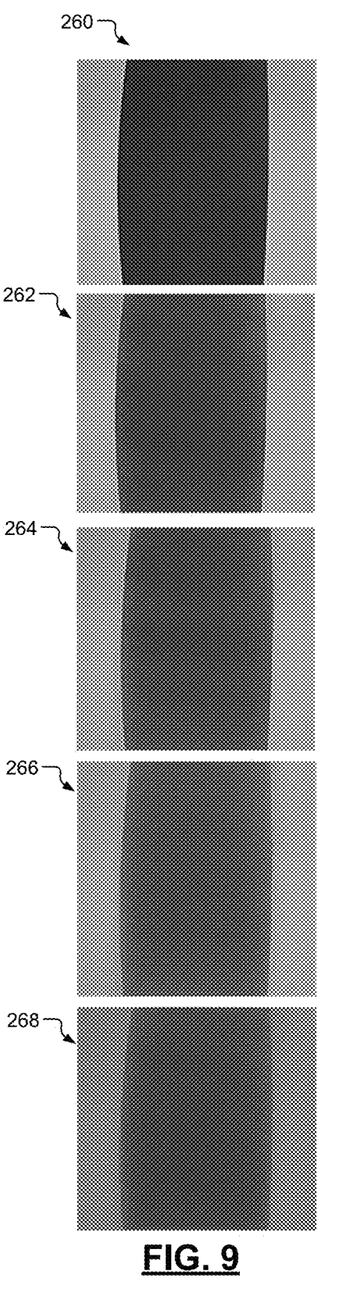
FIG. 9 is shows a plurality of example images captured by the camera after the lens of the camera is subjected to the same amounts of wear as in FIG. 8, where the images show a test object.

FIGS. 8 and 9 illustrate an example method for determining the predetermined value to which the contrast of an image captured by the camera 22 is compared at 92 of FIG. 3 to assess the degradation in the performance of the camera 22. FIG. 8 shows real images captured by the camera 22 when the environment rearward of the vehicle 10 is in view of the camera 22. The real images include a first real image 250, a second real image 252, a third real image 254, the fourth real image 256, and a fifth real image 256. FIG. 9 shows test images captured by the camera 22 when the test object 26 is in view of the camera 22. The test images include a first test image 260, the second test image 262, a third test image 264, the fourth test image 266, and the fifth test image 266.

The first real image 250 and the first test image 260 are captured by the camera 22 when the camera 22 is new. The second real image 252 and the second test image 262 are captured by the camera 22 after the lens of the camera 22 has been subjected to a first amount of wear. The third real image 254 and the third test image 264 are captured by the camera 22 after the lens of the camera 22 has been subjected to a second amount of wear that is greater than the first amount of wear. The fourth real image 256 and the fourth test image 266 are captured by the camera 22 after the lens of the camera 22 has been subjected to a third amount of wear that is greater than the second amount of wear. The fifth real image 258 and the fifth test image 268 are captured by the camera 22 after the lens of the camera 22 has been subjected to a fourth amount of wear that is greater than the third amount of wear. The first, second, third, and fourth amounts of wear may be applied to the lens of the camera 22 using a predetermined procedure that replicates a standardized mechanical cleaning action.

The real images 250-258 are then subjectively or qualitatively evaluated by a test audience to determine the point in time when the audience, as potential or actual customers of the camera 22, would take the vehicle 10 in for service and replace the camera 22. For example, the test audience may determine that contrast of the first, second, and third real images 250, 252, and 254 are acceptable, while the contrast the fourth and fifth real images 256 and 258 are unacceptable.

The contrast of the test images 260-268 is determined according to the method of FIG. 3. The first, second, and third test images 260, 262, and 264 are similar or identical to the image 100 of FIG. 5A, the image 150 of FIG. 6A, and the image 200 of FIG. 7A, respectively. Thus, the method for determining the contrast of the first, second, and third test images 260, 262, and 264 is explained in detail above. In addition, the contrast of the fourth and fifth test images to 66 and 268 may be determined in a similar manner. Further, in the above examples, the contrast of the first, second, and third test images 260, 262, and 264 is 100 percent, 60 percent, and 40 percent, respectively. Following this trend, the contrast of the fourth and fifth test images 266 and 268 may be 30 percent and 25 percent, respectively.

The contrast of the test images 260-268 are then compared to the subjective or qualified observations about the real images 250-258 made by the test audience to determine the predetermined value for assessing degradation in the performance of the camera 22. For example, if the test audience determines that the contrast of the third real image 254 is acceptable while the contrast of the fourth real image 256 is unacceptable, the predetermined value may be set to a value within a range between the contrast of the third test image 264 and the contrast of the fourth test image 266 (e.g., a value within a range between 40 percent and 30 percent). Once the predetermined value is selected, the degradation in the viewing performance of the camera 22 may be assessed without using the real images 250-258. For example, the degradation in the viewing performance of the camera may be assessed by determining whether the contrast of the test images 260-268 is less than predetermined value.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A method comprising:
capturing a first image of an object at a first time using a camera, the object including a light portion and a dark portion that is darker than the light portion;
assigning shade values to a plurality of pixels in a portion of the first image;
identifying a first mode value of the shade values corresponding to the light portion of the object in the first image;
identifying a second mode value of the shade values corresponding to the dark portion of the object in the first image;
determining a difference between the first and second mode values; and
determining a contrast of the first image based on the difference, wherein:
the portion of the first image includes only a predetermined number of pixels on both sides of an edge between the light portion of the object and the dark portion of the object;
the predetermined number of pixels is less than the total number of pixels on both sides of the edge in the portion of the first image,
the portion of the first image includes only a first predetermined number of pixels on a first side of the edge and a second predetermined number of pixels on a second side of the edge; and
the second predetermined number is equal to the first predetermined number.

2. The method of claim 1 further comprising determining that the contrast of the first image is unacceptable when the difference is less than a predetermined value.

3. The method of claim 1 wherein the light portion is white in color, the dark portion is black in color, and the shade values indicate shades of grey.

4. The method of claim 1 wherein the shade values indicate shades of grey with lower ones of the shade values indicating darker shades of grey and higher ones of the shade values indicating lighter shades of grey.

5. The method of claim 1 wherein the portion of the first image does not include the entire first image.

6. The method of claim 1 wherein:
the object includes a first white vertical bar, a second white vertical bar, and a black vertical bar disposed between the first and second white vertical bars;
the white vertical bars form the light portion of the object; and
the black vertical bar forms the dark portion of the object.

7. The method of claim 6 wherein the portion of the first image includes:
a third predetermined number of pixels on both sides of a first vertical edge between the first white vertical bar and the black vertical bar; and
a fourth predetermined number of pixels on both sides of a second vertical edge between the black vertical bar and the second white vertical bar.

8. The method of claim 7 wherein the portion of the first image includes:
the third predetermined number of pixels on both sides of the first vertical edge for all horizontal rows of pixels in the first image; and
the fourth predetermined number of pixels on both sides of the second vertical edge for all of the horizontal rows of pixels in the first image.

9. The method of claim 1 further comprising:
capturing a second image of the object at a second time using the camera, wherein the second time is later than the first time;
assigning shade values to a plurality of pixels in a portion of the second image;
identifying a third mode value of the shade values corresponding to the light portion of the object in the second image;
identifying a fourth mode value of the shade values corresponding to the dark portion of the object in the second image;
determining a difference between the third and fourth mode values; and
determining a degradation in a viewing performance of the camera based on (i) the difference between the first and second mode values and (ii) the difference between the third and fourth mode values.

10. The method of claim 9 further comprising applying wear to a lens of the camera according to a predetermined procedure during a period between the first and second times.

11. The method of claim 9 further comprising:
normalizing the difference between the third and fourth mode values with respect to the difference between the first and second mode values; and
determining the degradation in the viewing performance of the camera based on the normalized difference.

12. The method of claim 11 further comprising determining that the degradation in the viewing performance of the camera is unacceptable when the normalized difference is less than a predetermined value.

13. A method comprising:
capturing a first image of an object at a first time using a camera, the object including a light portion and a dark portion that is darker than the light portion;
assigning shade values to a plurality of pixels in a portion of the first image;
identifying a first mode value of the shade values corresponding to the light portion of the object in the first image;
identifying a second mode value of the shade values corresponding to the dark portion of the object in the first image;
determining a difference between the first and second mode values;
capturing a second image of the object at a second time using the camera, wherein the second time is later than the first time;
assigning shade values to a plurality of pixels in a portion of the second image;
identifying a third mode value of the shade values corresponding to the light portion of the object in the second image;
identifying a fourth mode value of the shade values corresponding to the dark portion of the object in the second image;
determining a difference between the third and fourth mode values; and
determining a degradation in a viewing performance of the camera based on (i) the difference between the first and second mode values and (ii) the difference between the third and fourth mode values.

14. The method of claim 13 further comprising applying wear to a lens of the camera according to a predetermined procedure during a period between the first and second times.

15. The method of claim 13 further comprising:
normalizing the difference between the third and fourth mode values with respect to the difference between the first and second mode values; and
determining the degradation in the viewing performance of the camera based on the normalized difference.

16. The method of claim 13 wherein:
the object includes a first white vertical bar, a second white vertical bar, and a black vertical bar disposed between the first and second white vertical bars;
the white vertical bars form the light portion of the object; and
the black vertical bar forms the dark portion of the object.

17. The method of claim 16 wherein each of the portion of the first image and the portion of the second image includes:
a first predetermined number of pixels on both sides of a first vertical edge between the first white vertical bar and the black vertical bar; and
a second predetermined number of pixels on both sides of a second vertical edge between the black vertical bar and the second white vertical bar.

18. The method of claim 17 wherein each of the portion of the first image and the portion of the second image includes:
the first predetermined number of pixels on both sides of the first vertical edge for all horizontal rows of pixels in the first image; and
the second predetermined number of pixels on both sides of the second vertical edge for all of the horizontal rows of pixels in the first image.

19. A system comprising:
an electronic display;
a camera configured to:
capture a first image of an object at a first time, wherein the object includes a light portion and a dark portion that is darker than the light portion; and
capture a second image of the object at a second time, wherein the second time is later than the first time;
a shade value circuit configured to:
assign shade values to a plurality of pixels in a portion of the first image; and
assign shade values to a plurality of pixels in a portion of the second image;
a mode value circuit configured to:
identify a first mode value of the shade values corresponding to the light portion of the object in the first image;
identify a second mode value of the shade values corresponding to the dark portion of the object in the first image;
identify a third mode value of the shade values corresponding to the light portion of the object in the second image; and
identify a fourth mode value of the shade values corresponding to the dark portion of the object in the second image; and
a contrast circuit configured to:
determine a difference between the first and second mode values;
determine a difference between the third and fourth mode values;
normalize the difference between the third and fourth mode values with respect to the difference between the first and second mode values;
determine that a degradation in a viewing performance of the camera is unacceptable when the normalized difference is less than a predetermined value; and
control the electronic display to display a message indicating when the degradation in the viewing performance of the camera is unacceptable.

\* \* \* \* \*